(12) United States Patent
Kucharski

(10) Patent No.: US 7,475,527 B2
(45) Date of Patent: Jan. 13, 2009

(54) AQUA WEED TILLER

(75) Inventor: Barry Kucharski, Woodbury, MN (US)

(73) Assignee: Cabin - Gear, Inc., Shell Lake, WI (US)

( * ) Notice: Subject to any disclaimer, the term of this patent is extended or adjusted under 35 U.S.C. 154(b) by 0 days.

(21) Appl. No.: 11/699,619

(22) Filed: Apr. 12, 2007

(65) Prior Publication Data

US 2007/0193238 A1   Aug. 23, 2007

Related U.S. Application Data

(60) Provisional application No. 60/762,805, filed on Jan. 27, 2006.

(51) Int. Cl.
*A01D 44/00* (2006.01)

(52) U.S. Cl. .......................................................... 56/8

(58) Field of Classification Search .................. 56/8, 56/9; 172/554, 247, 545, 551, 21; 111/118, 111/128; 37/343, 328, 342, 341, 326; 294/66.1, 294/53.5; 239/754
See application file for complete search history.

(56) References Cited

U.S. PATENT DOCUMENTS

| | | | | |
|---|---|---|---|---|
| 2,595,177 A | * | 4/1952 | Stevens | ........................ 56/364 |
| 2,603,051 A | * | 7/1952 | Williams | ........................ 56/8 |
| 3,126,656 A | * | 3/1964 | Blackwell, Jr. | ................ 37/189 |
| 4,073,504 A | * | 2/1978 | Knapp | ......................... 280/220 |
| 4,339,158 A | * | 7/1982 | Greener et al. | .............. 384/489 |
| 4,768,596 A | * | 9/1988 | Riski | ........................... 172/545 |
| 4,847,944 A | * | 7/1989 | Lackner | ........................ 15/392 |
| 5,079,905 A | * | 1/1992 | Bergstrom | ........................ 56/8 |
| 5,359,835 A | * | 11/1994 | Majkrzak | .......................... 56/8 |
| 5,655,807 A | * | 8/1997 | Rosario | ........................ 296/98 |
| 2003/0045413 A1 | * | 3/2003 | Gillen et al. | ................... 492/47 |

* cited by examiner

*Primary Examiner*—Árpád Fábián-Kovács
(74) *Attorney, Agent, or Firm*—Tipton L. Randall

(57) ABSTRACT

An aqua tiller device. The device includes a hollow, liner body member having interior and exterior surfaces and open ends. A plurality of tine members, each having an L-shaped end, protrude radially from the body member with the L-shaped end opposite thereto. A linear, axle member is positioned within the hollow, linear body member and extends beyond the ends thereof. An end cap member is attachable at each end of the body member. The end cap members each have an aperture therein allowing the axle member to protrude there through and rotate therein. An eye bolt assembly is rotatably attached at each end of the axle member. The eye bolt assemblies are attached to of a length of rope for moving the weed tiller device over a submerged surface. The hollow, linear body member and end cap members are adapted for receiving fill material for adding weight to the weed tiller device.

20 Claims, 12 Drawing Sheets

AQUA WEED TILLER

CROSS-REFERENCE TO RELATED APPLICATIONS, IF ANY

This application claims the benefit under 35 U.S.C. §119 (e) of provisional application Ser. No. 60/762,805, filed 27 Jan. 2006. application Ser. No. 60/762,805 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

BACKGROUND OF THE INVENTION

1. Field of the Invention

The present invention relates, generally, to aquatic vegetation control devices and methods. Particularly, the invention relates to a device for abating or controlling aquatic vegetation in bodies of water such as lakes, ponds, rivers, and streams.

2. Background Information

The state of the art includes mechanical and chemical means of cutting or killing aquatic vegetation. Existing devices are believed to include a ROTEX, towing spring beds or makeshift drags behind boats, Lake Rakes or weighted rakes, an Aquatic Weed Eradicator or double sided serrated edge blade attached to a handle, a Weed Roller motorized rotating drum or cylinder attached to a dock with a motor, and mechanical cutters located on pontoons or transoms. This technology is believed to have significant limitations and shortcomings, including but not limited to requiring motors, being limited to small areas and shallow depths, and being expensive. For this and other reasons, a need exists for the present invention.

All US patents and patent applications, and all other published documents mentioned anywhere in this application are incorporated by reference in their entirety.

BRIEF SUMMARY OF THE INVENTION

The invention provides a lake weed removal apparatus, method of manufacture therefor and method of use therefor, which are practical, reliable, accurate and efficient, and which are believed to fulfill the need and to constitute an improvement over the background technology.

The device and method of use therefor creates a unique vibrating, gyrating and rotating motion that digs tines into a lake bottom and uproots plants quickly using relatively little energy. The vibrating motion changes frequency in relation to changes in RPM. A motor is not required for use. Chemicals are not required for use.

The aspects, features, advantages, benefits and objects of the invention will become clear to those skilled in the art by reference to the following description, claims and drawings.

DETAILED DESCRIPTION

Figure 1:
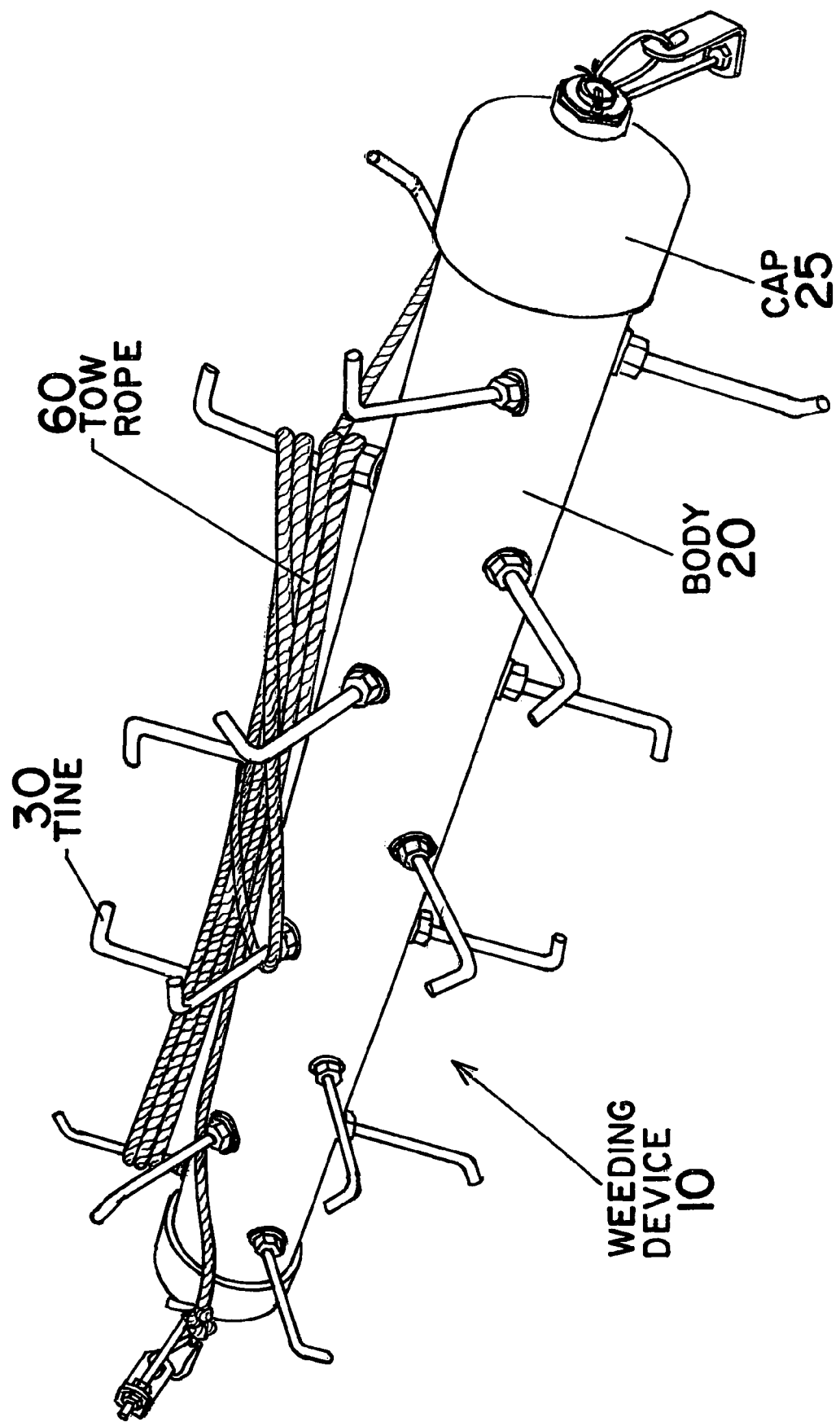
FIG. 1 is a perspective view of an embodiment of the device of the present invention.
Figure 2:
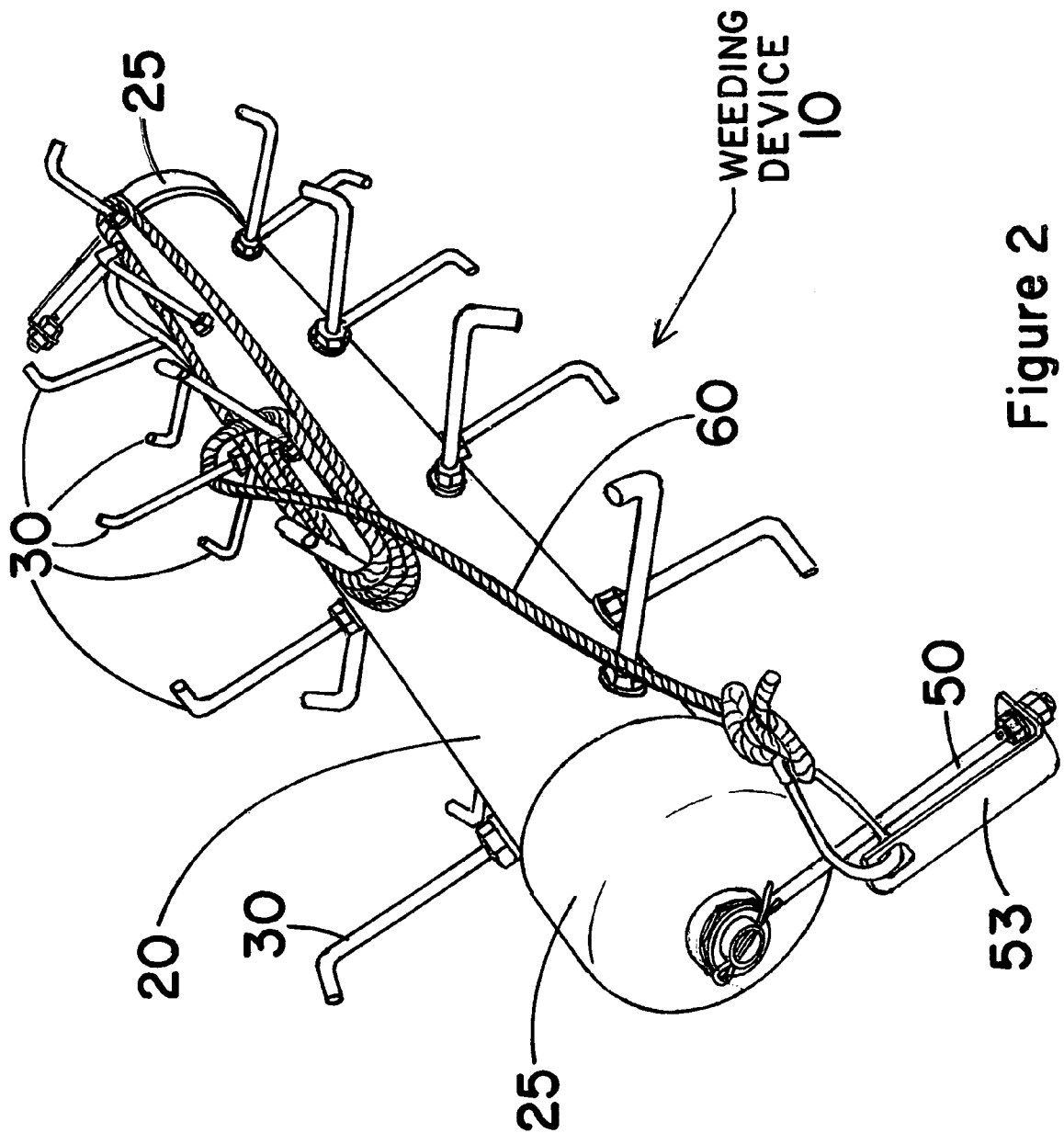
FIG. 2 is a perspective view of the device from the opposite side.
Figure 3:
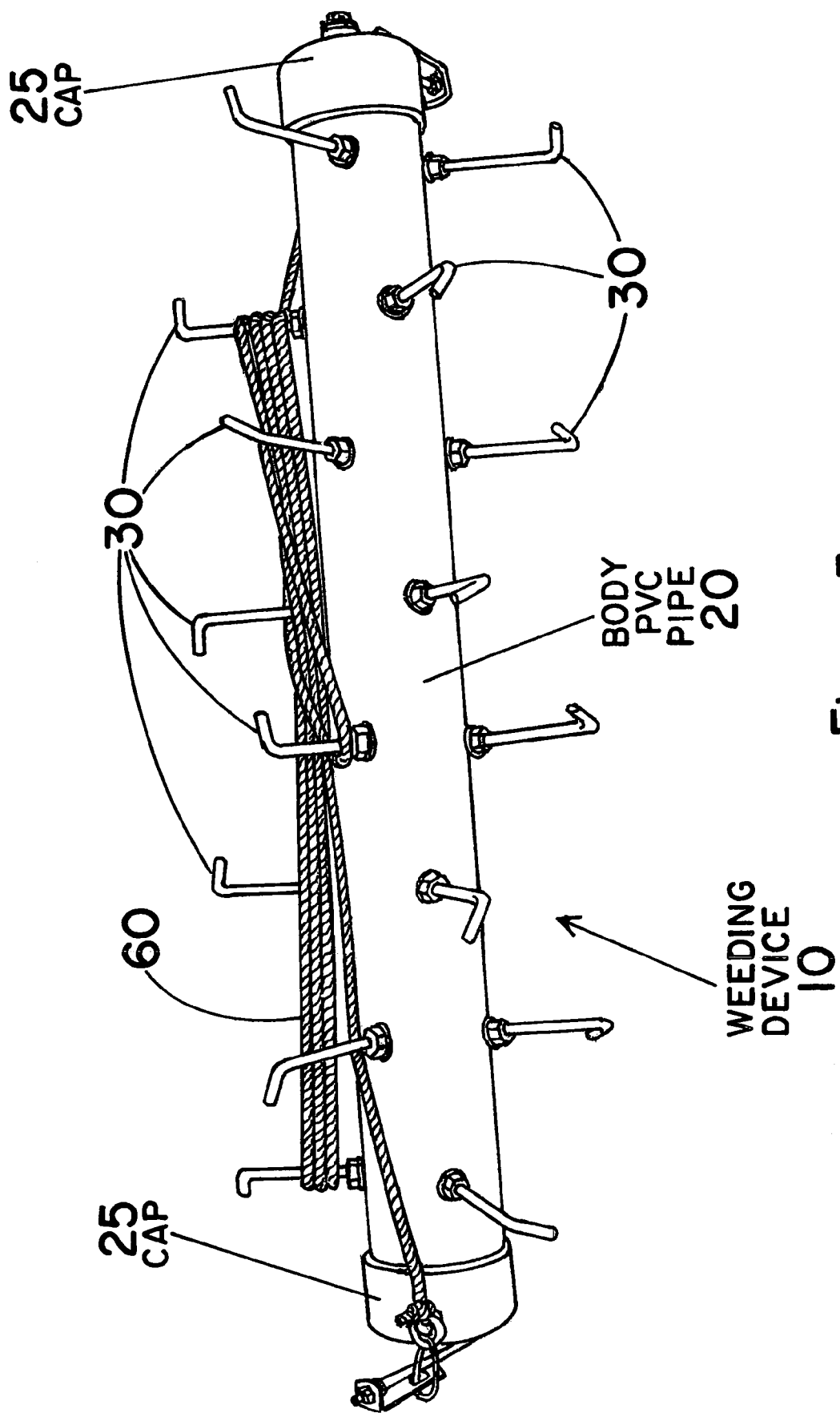
FIG. 3 is a side view of the device.
Figure 4:
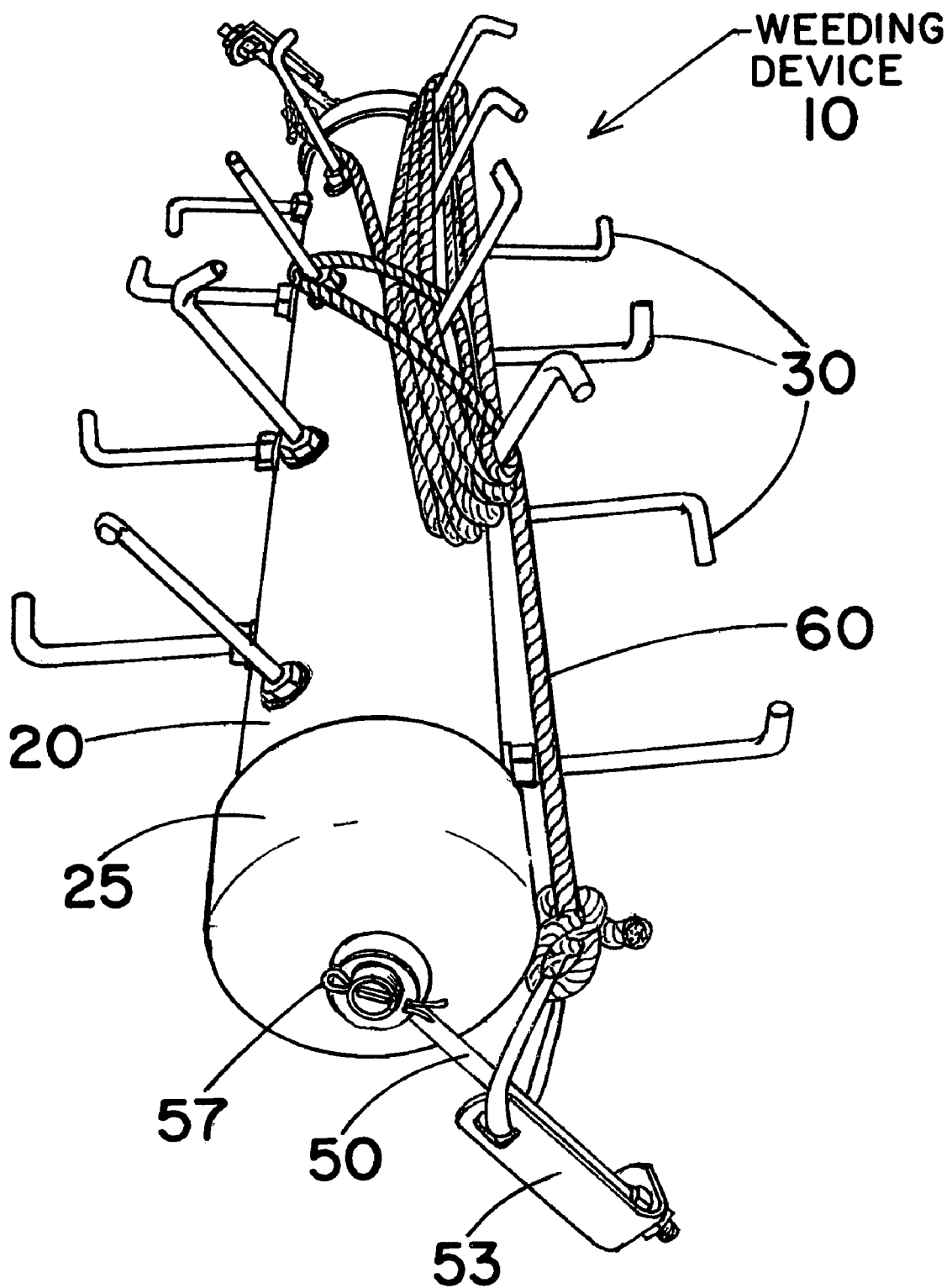
FIG. 4 is an end view of the device.
Figure 5:
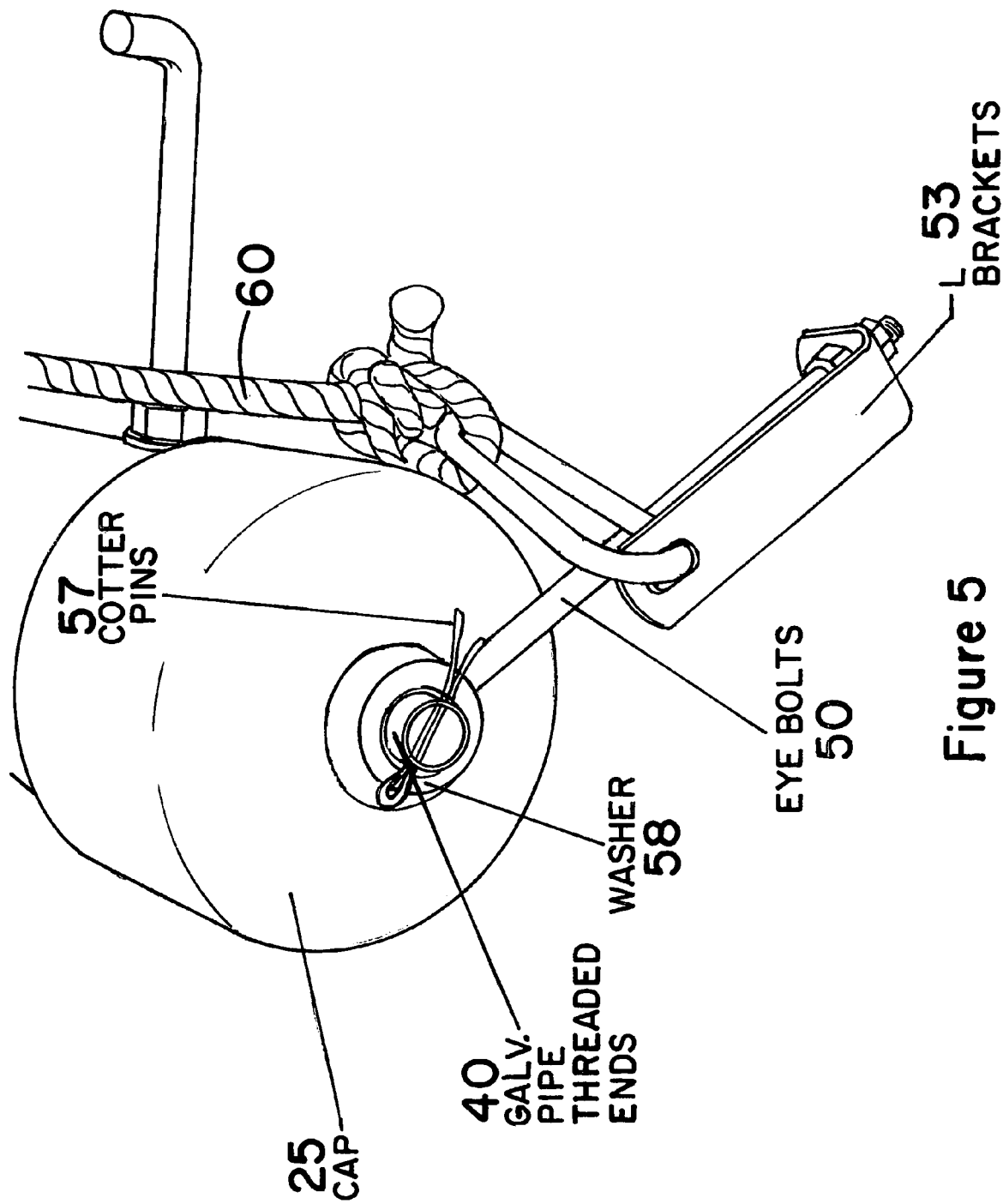
FIG. 5 is a detailed view of the end of the device.
Figure 6:
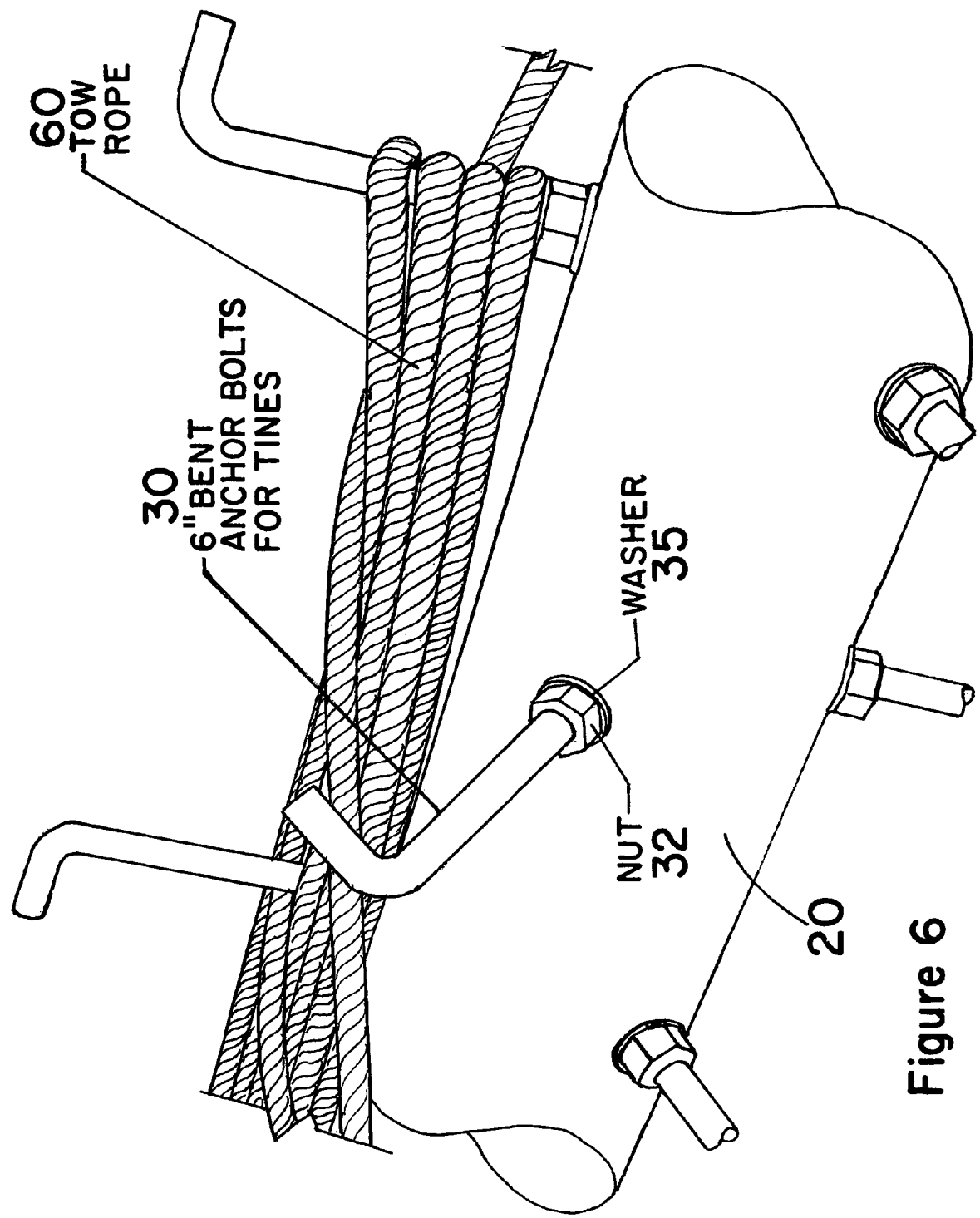
FIG. 6 is a detailed view of a central portion of the device.
Figure 7:
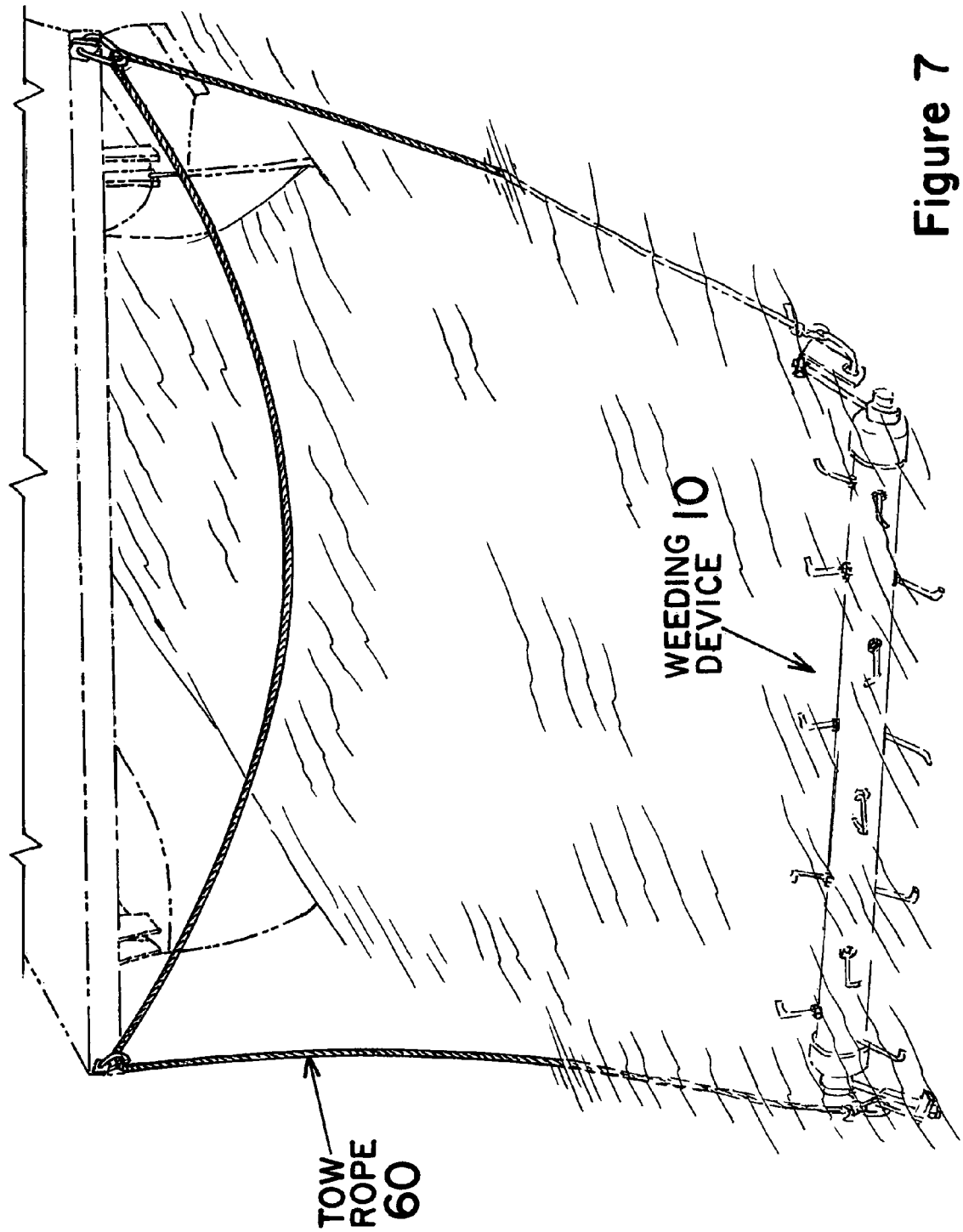
FIG. 7 illustrates the device deployed with a watercraft for use.
Figure 8:
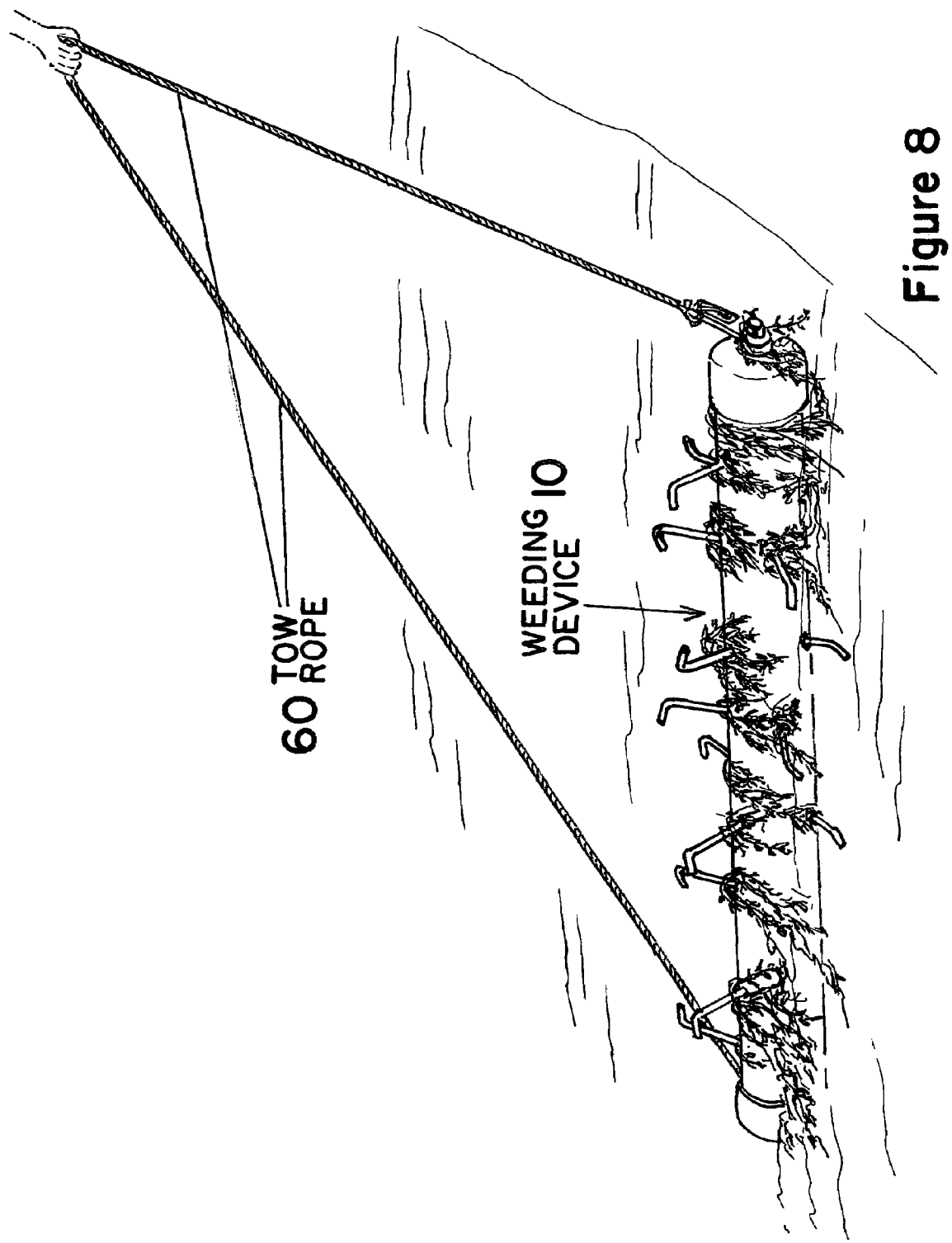
FIG. 8 illustrates the device deployed for pulling manually by a user.
Figure 9:
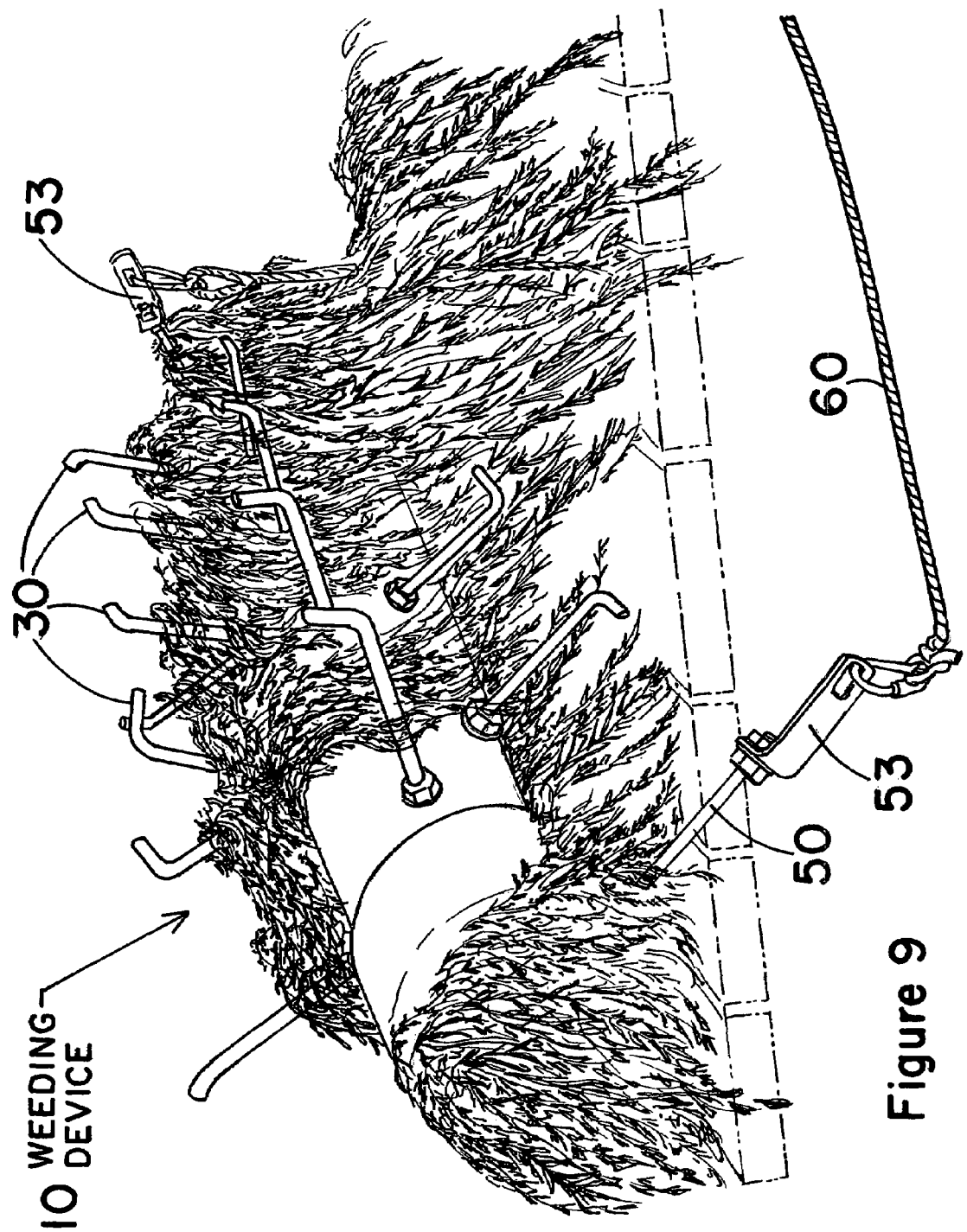
FIG. 9 shows the device after use to pull or cut weeds.
Figure 10:
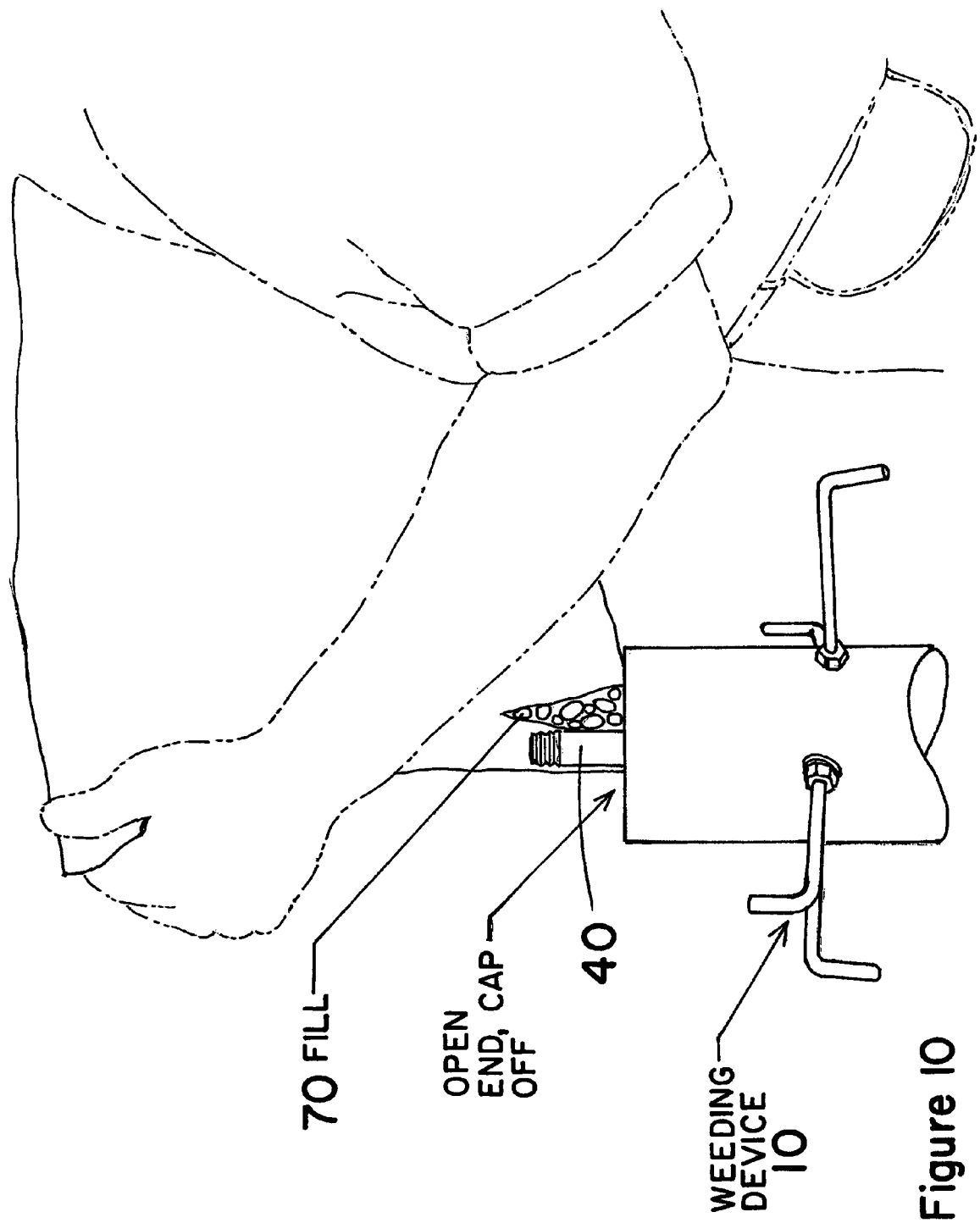
FIG. 10 illustrates the device being loaded with gravel for weight prior to use.
Figure 11:
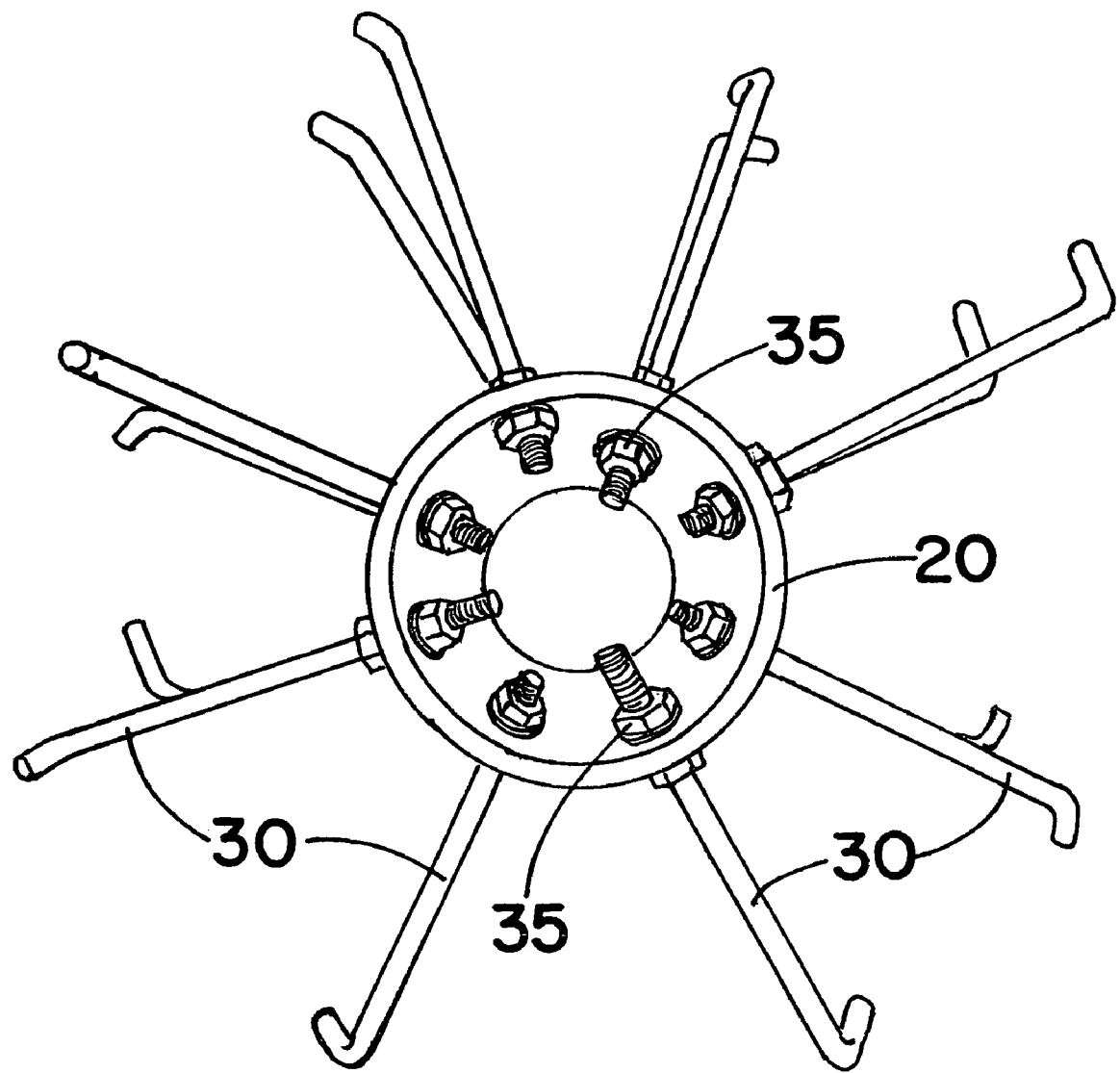
FIG. 11 is an end view of another embodiment of the device, with the cap off and the center rod removed for clarity.
Figure 12:
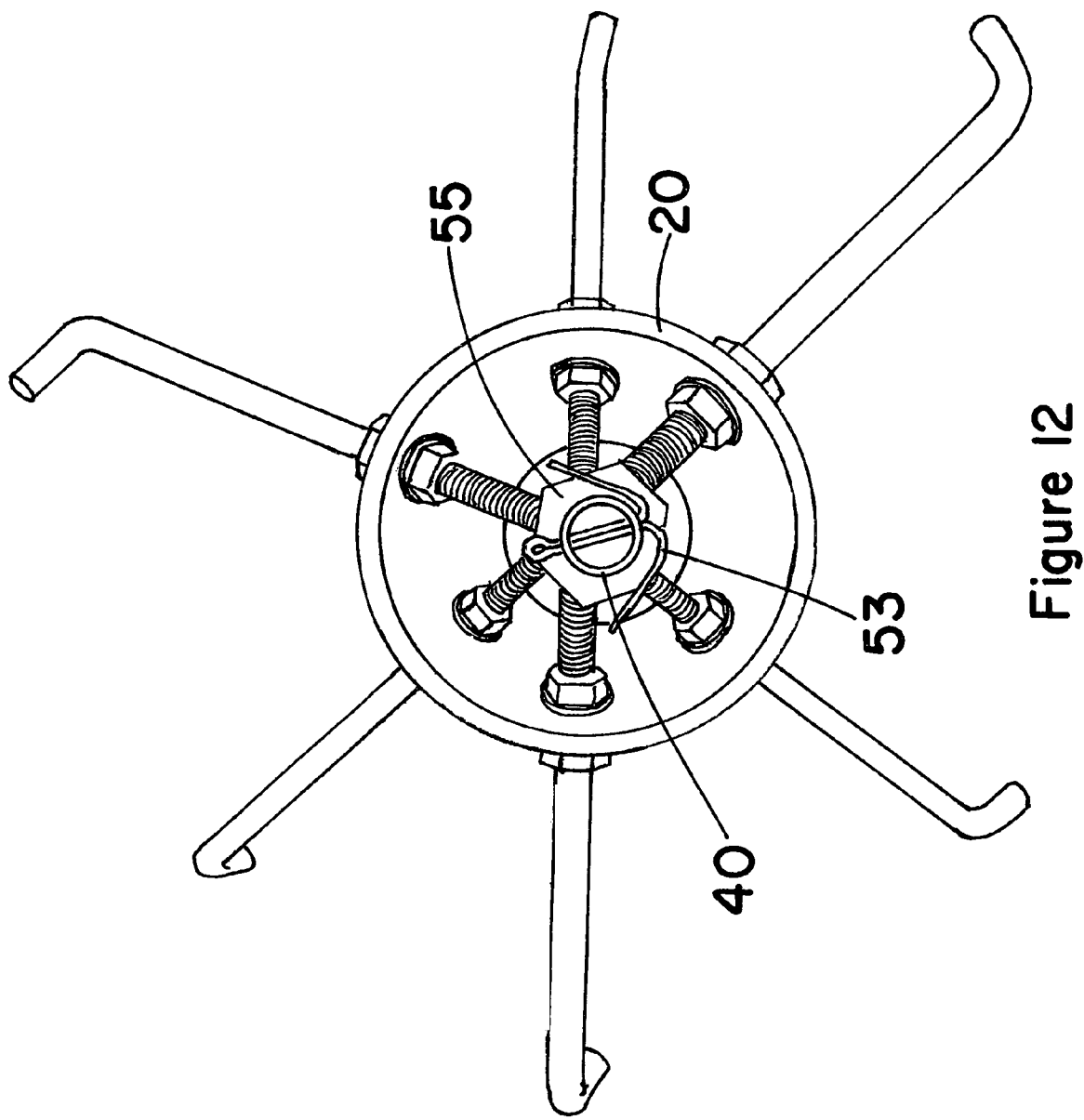
FIG. 12 is an end view of the device of FIG. 11 with the center rod installed.

Embodiments of the device and methods of the invention are shown in the drawings.

The aqua tiller device 10 works essentially like an underwater roto-tiller. Short weeds float to surface and longer weeds collect on housing It easily rolls to shore. The device 10 can be used to clean swimming areas in lakes, ponds and the like. The device is portable. No motor or chemicals are needed so it is environmentally friendly. The device and method loosen sediment and muck allowing sand to settle and firm up. The device operates from dock or lake, and works in shallow or deep water.

The Aqua-Tiller 10 is ruggedly constructed of rust resistant materials i.e. double chrome steel tines 30, galvanized steel shaft and zinc-plated steel hardware. It weighs approximately 27 lbs. empty. After adding rock it weighs up to 80 lbs. It's easy to pull because it has a high center of gravity that helps it to "tip" from one position to the next, the rock inside becomes a "live" load and the motion helps it to move. Each tine 30 digs in with a static force of 10 to 20 lbs. per tine 30, depending on how much weight 70 is inside.

| | Device Materials List |
|---|---|
| 25 | 4" PVC caps (2) |
| 20 | PVC pipe - 4 x 55" (1) |
| 40 | ½ x 60" galvanized pipe with threaded ends (1) |
| 55 | ½" pipe locknuts galvanized (2) |
| 30 | ½" x 6" bent anchor bolts galvanized or zinc plated (24) |
| 32 | ½" zinc plated nuts (48) |
| 35 | zinc plated lock washers (24) |
| 50 | eyebolts ¾ x ⅜ x 10" (2) |
| 53 | ⅜" rod ends or "L" brackets with eyes for rope (2) |
| 58 | ⅜" zinc plated lock washers (2) |
| 60 | 25' rope, ⅜" dia. polyethylene yellow or high visibility (1) |
| 57 | 1/16" SS cotter pins (2) |
| 70 | 50 lbs. minus ½: pebbles, pea gravel or taconite pellets or concrete (1) |
| | 8 oz. Dupont Krylon PVC paint OSHA bright yellow (1) |

The device 10 is made by bolting the tines 30 with ½ inch outer nut 33, lock washer 35 and the ½ inch inner nut 37 to the PVC housing 20. The housing 20 is predrilled with ½ inch holes placed at predetermined points. If an outer force hits a tine 30, the force is absorbed by the entire steel framework. A 4 inch cap 25 is slid onto either end of the housing 20, followed by a washer 37 and 1½×⅜×8 inch eyebolt 50, a ½ inch pipe lock nut 55 and a 1/16 inch cotter pin 57. Prior to use, the assembly 10 is set on end and filled with up to 50 pounds of material 70. The remaining cap 25 is installed following same procedure above.

The Aqua-Tiller 10 is used by adding gravel 1" or smaller (available on-site or at your local Home Center). This allows you to adjust the weight 70 in the machine to your lake bottom conditions all Lake bottoms are different. The Aqua-Tiller works best in soft bottom (sand or mucky) lakes. After loading, the device is pulled slowly and evenly through the weedy area. Rock cascades inside the device housing 20 and is jolted by the continual impact of the tines 30, creating a unique "gyratory" motion. The amount of weight 70 in the housing 20 can be adjusted to suit individual lake-bottom conditions. It is steered by pulling the rope 60 in the direction that one desired it to go. At the end of an area, the rope 60 is flipped back over the unit 10 to go back over the area again, it works in both directions.

Motion is created by a live or static load inside the housing 20 combined with tines 30 which are strategically placed so that the load shifts from one position to the next, first slowly and then quickly, causing the device 10 to rotate. During speed changes, the device 10 vibrates and differing frequencies as the material 70 inside the body 20 changes position. The device 10 essentially walks over obstacles such as rocks.

The descriptions above and the accompanying materials should be interpreted in the illustrative and not the limited sense. While the invention has been disclosed in connection with the preferred embodiment or embodiments thereof, it should be understood that there may be other embodiments which fall within the scope of the invention.

The invention claimed is:

1. A weed tiller device for submerged use comprising;
a hollow, linear body member having interior and exterior surfaces and open ends;
a plurality of tine members each having an L-shaped end, each tine member protruding radially from the hollow, linear body member with the L-shaped end opposite thereto;
a linear, axle member positioned interior the hollow, linear body member and extending beyond the ends thereof;
a pair of end cap members, each attachable at one end of the hollow, linear body member, the end cap members each having an aperture therein allowing the axle member to protrude there through and rotate therein;
a selected amount of particulate, weight material contained within the hollow, linear body member for adding weight to the weed tiller device; and
a pair of eye bolt assemblies, each assembly rotatably attached at one end of the axle member, the eye bolt assemblies adapted for attachment of a length of rope thereto for moving the weed tiller device over a submerged surface, the particulate weight material contained within the hollow, linear body member and the end cap members providing a jolting, gyrating motion as the weed tiller device moves over a submerged surface.

2. The weed tiller device for submerged use of claim 1, wherein the hollow, linear body member and the pair of end cap members are fabricated from polymeric resin material.

3. The weed tiller device for submerged use of claim 1, wherein the hollow, linear body member is cylindrical.

4. The weed tiller device for submerged use of claim 1, wherein the linear, axle member is positioned on a cylindrical axis of the hollow, linear body member.

5. The weed tiller device for submerged use of claim 1, wherein each tine member includes a threaded end opposite the L-shaped end, the threaded end penetrating the hollow, linear body member, the tine members secured thereto by nuts and washers contacting the interior and exterior surfaces of the hollow, linear body member.

6. The weed tiller device for submerged use of claim 1, wherein the tine members are arranged in six linear rows, each row parallel to the axle member, the rows having sixty degree intervals therebetween, with the tine members of a selected linear row offset from the tine members of adjacent rows.

7. The weed tiller device for submerged use of claim 1, wherein each eye bolt assembly includes an eye bolt member with a circular aperture in at least one end thereof, the axle member rotatably positioned within the circular aperture.

8. The weed tiller device for submerged use of claim 1, wherein each end cap member includes a concave surface fitting over the open end of the hollow, linear body member.

9. The weed tiller device for submerged use of claim 1, further including a length of rope attached to each eye bolt assembly, the rope adapted for moving the weed tiller device over a submerged surface.

10. A weed tiller device for submerged use comprising;
a hollow, cylindrical body member having interior and exterior surfaces and open ends;
a plurality of tine members each having an L-shaped end, each tine member protruding radially from the hollow, cylindrical body member with the L-shaped end opposite thereto;
a linear, axle member positioned interior and on a cylindrical axis of the hollow, cylindrical body member and extending beyond the ends thereof;
a pair of end cap members, each attachable at one end of the hollow, cylindrical body member, the end cap members each having an aperture therein allowing the axle member to protrude there through and rotate therein;
a selected amount of particulate, weight material contained within the hollow, cylindrical body member for adding weight to the weed tiller device; and
a pair of eye bolt assemblies, each assembly rotatably attached at one end of the axle member, the eye bolt assemblies adapted for attachment of a length of rope thereto for moving the weed tiller device over a submerged surface, the particulate weight material contained within the hollow, cylindrical body member and the end cap members providing a jolting, gyrating motion as the weed tiller device moves over a submerged surface.

11. The weed tiller device for submerged use of claim 10, wherein the hollow, cylindrical body member and the pair of end cap members are fabricated from polymeric resin material.

12. The weed tiller device for submerged use of claim 10, wherein each tine member includes a threaded end opposite the L-shaped end, the threaded end penetrating the hollow, cylindrical body member, the tine members secured thereto by nuts and washers contacting the interior and exterior surfaces of the hollow, cylindrical body member.

13. The weed tiller device for submerged use of claim 10, wherein the tine members are arranged in six linear rows, each row parallel to the axle member, the rows having sixty degree intervals therebetween, with tine members of a selected linear row offset from the tine members of adjacent rows.

14. The weed tiller device for submerged use of claim 10, wherein each eye bolt assembly includes an eye bolt member with a circular aperture in at least one end thereof, the axle member rotatably positioned within the circular aperture.

15. The weed tiller device for submerged use of claim 10, wherein each end cap member includes a concave surface fitting over the open end of the hollow, cylindrical body member.

16. A weed tiller device for submerged use comprising;
   a hollow, cylindrical body member having interior and exterior surfaces and open ends;
   a plurality of tine members each having an L-shaped end, each tine member protruding radially from the hollow, linear body member with the L-shaped end opposite thereto;
   a linear, axle member positioned interior and on a cylindrical axis of the hollow, linear body member and extending beyond the ends thereof;
   the tine members arranged in six linear rows, each row parallel to the axle member, at sixty degree intervals therebetween, with the tine members of a selected linear row offset from the tine members of adjacent rows;
   a pair of end cap members, each attachable at one end of the hollow, linear body member, the end cap members each having an aperture therein allowing the axle member to protrude there through and rotate therein;
   a selected amount of particulate, weight material contained within the hollow, cylindrical body member for adding weight to the weed tiller device; and
   a pair of eye bolt assemblies, each assembly rotatably attached at one end to the axle member, the eye bolt assemblies adapted for attachment of a length of rope thereto for moving the weed tiller device over a submerged surface, the particulate weight material contained within the hollow, linear body member and the end cap members providing a jolting, gyrating motion as the weed tiller device moves over a submerged surface.

17. The weed tiller device for submerged use of claim 16, wherein the hollow, cylindrical body member and the pair of end cap members are fabricated from polymeric resin material.

18. The weed tiller device for submerged use of claim 16, wherein each tine member includes a threaded end opposite the L-shaped end, the threaded end penetrating the hollow, cylindrical body member, the tine members secured thereto by nuts and washers contacting the interior and exterior surfaces of the hollow, cylindrical body member.

19. The weed tiller device for submerged use of claim 16, wherein each eye bolt assembly includes an eye bolt member with a circular aperture in at least one end thereof, the axle member rotatably positioned within the circular aperture.

20. The weed tiller device for submerged use of claim 16, wherein each end cap member includes a concave surface fitting over the open end of the hollow, cylindrical body member.

* * * * *